US005546456A

United States Patent [19]
Vilsoet et al.

[11] Patent Number: 5,546,456
[45] Date of Patent: Aug. 13, 1996

[54] TELECOMMUNICATION SYSTEM WITH INBOUND CALL RESPONSIVE PREDICTIVE OUTDIALING SYSTEM AND METHOD

[75] Inventors: Robert W. Vilsoet, Streamwood; Bernard J. McGourty, Westmont, both of Ill.

[73] Assignee: Rockwell International Corporation, Seal Beach, Calif.

[21] Appl. No.: 559,732

[22] Filed: Nov. 15, 1995

Related U.S. Application Data

[63] Continuation of Ser. No. 284,855, Aug. 2, 1994, abandoned.

[51] Int. Cl.[6] ........................................... H04M 3/50
[52] U.S. Cl. .................. 379/265; 379/266; 379/309; 379/216; 379/214
[58] Field of Search .................... 379/265, 266, 379/309, 214, 218, 216

[56] References Cited

U.S. PATENT DOCUMENTS

| 5,025,468 | 6/1991 | Sikland et al. | 379/266 |
|---|---|---|---|
| 5,166,974 | 11/1992 | Morganstein et al. | 379/266 |
| 5,214,688 | 5/1993 | Szlam et al. | 379/67 |
| 5,247,569 | 9/1993 | Cave | 379/266 |
| 5,295,184 | 3/1994 | Smith et al. | 379/216 |
| 5,309,505 | 5/1994 | Szlam et al. | 379/214 |
| 5,327,490 | 7/1994 | Cave | 379/216 |
| 5,341,412 | 8/1994 | Ramot et al. | 379/265 |
| 5,425,093 | 6/1995 | Trefzger | 379/266 |

*Primary Examiner*—Jeffery Hofsass
*Assistant Examiner*—Parag Dharia
*Attorney, Agent, or Firm*—C. B. Patti; G. A. Montayne

[57] ABSTRACT

A telecommunication system (10) having an automatic call distributor (12) with a multiport switch (14) controlled by a central control processing unit (16) in conjunction with a main memory (18) and in which the automatic call distributor (12) is coupled with an external telephonic network (26) having external telephonic units (22) for automatically distributing outdialed calls answered at the external units (22) to an agent telephonic unit (20) and for automatically distributing inbound calls received at the multiport switch (14) for the external units (22) to the agent telephonic unit (20), the automatic call distributor (12) is coupled with a tandem computer (34) which determines the pacing of outdialed calls by coordinating the number of outdial calls made with the number of inbound calls received to reduce the average incoming call waiting time due to excessive distribution of outdialed calls to the agent telephonic unit.

20 Claims, 2 Drawing Sheets

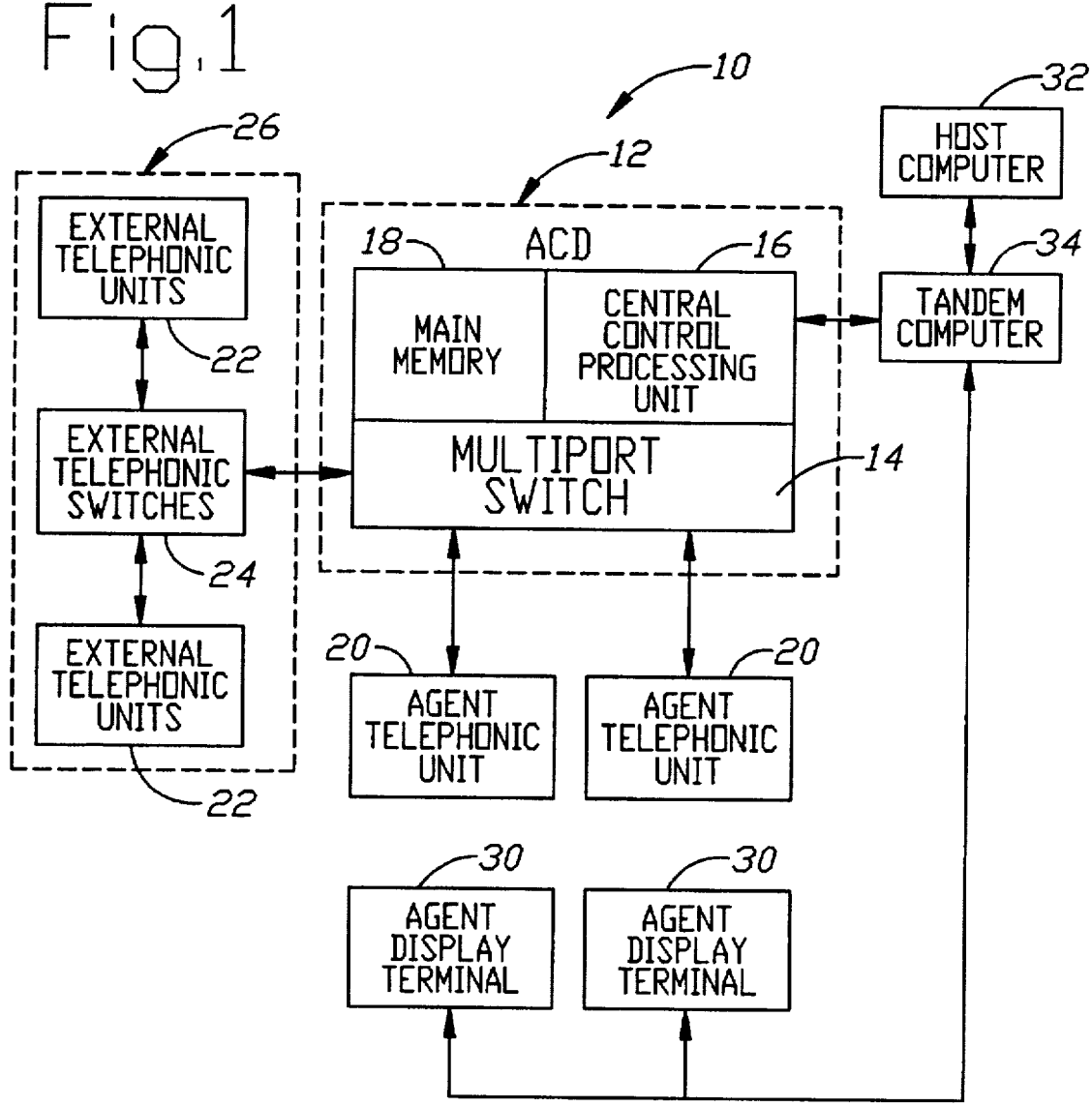

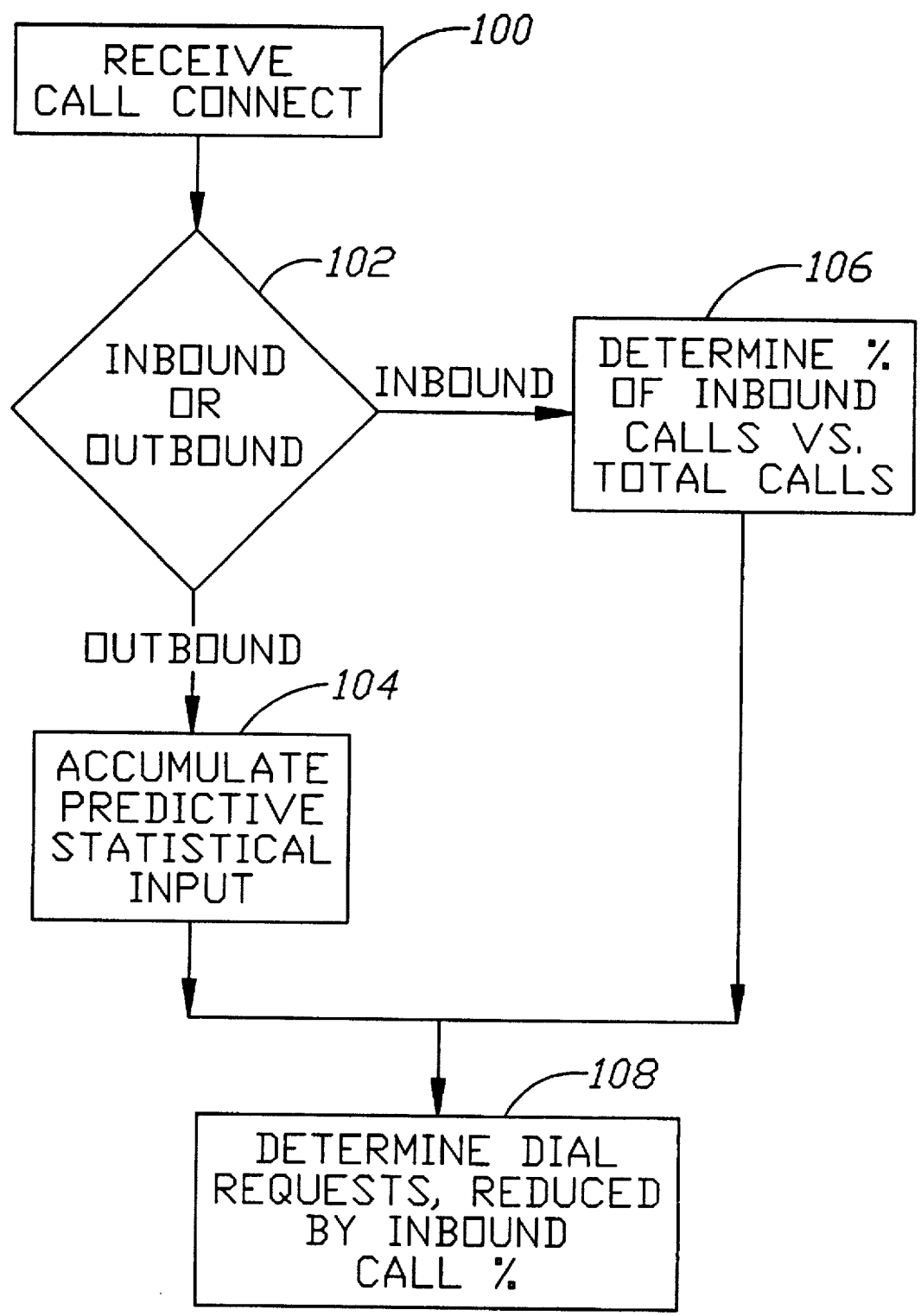

5,546,456

TELECOMMUNICATION SYSTEM WITH INBOUND CALL RESPONSIVE PREDICTIVE OUTDIALING SYSTEM AND METHOD

This application is a continuation of application Ser. No. 08/284,855, filed Aug. 2, 1994, now abandoned.

BACKGROUND OF THE INVENTION

1. Field of the Invention

This invention relates generally to the field of telecommunication systems and, more particularly, to a telecommunication system with an automatic call distributor which predictively outdials telephonic calls to external telephonic units of an external telephonic network.

2. Description of the Related Art Including Information Disclosed Under 37 C.F.R. Section 1.97–1.99

Telecommunication systems employing an automatic call distributor having a multiport switch controlled by a central control processing unit in conjunction with a main memory for selectively connecting telephonic inbound calls received from external telephonic units of an external telephonic switching network are well known. Examples of such call distributor systems are shown in U.S. Pat. No. 5,268,903 of Jones et al. entitled "Multichannel Telephonic Switching Network With Different Signaling Formats and Connect/PBX Treatment Selectable For Each Channel", issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

It is also known in such telecommunication systems to have a host data base computer coupled with the automatic call distributor. The host data base computer contains information relating to customers at the external telephonic unit. The automatic call distributor interacts with the host data base computer to provide agents stationed at internal telephonic units of the call distributor information relating to a particular customer communicating with the servicing agent. In such telecommunication systems it is known to have an automatic call distributor which connects incoming calls from external telephonic units to one group of internal units and initiates outbound calls from the call distributor which are answered by external units and are connected to another selected group internal telephonic units. In order to perform outdial or outbound calls in known telecommunication systems another data base computer or a tandem computer interfacing with the automatic call distributor and host computer is employed.

In these known systems a predictive outdial call pacing process executes on the tandem data base computer and provides outdial calling instructions to the automatic call distributor. Predictive outdialing attempts to automatically connect outdialed calls to customers at such a paced rate that the telecommunication system will keep a group of agents at near full occupancy with answered calls. The predictive outdial call pacing is adjusted so that the delay of outdialed calls placed in a queue is kept to a minimum.

Disadvantageously, however, in known telecommunication systems, agents stationed at internal telephonic units of the call distributor are limited to servicing either only inbound calls or outbound calls. Known call distributor do not permit an individual agent to receive and service both inbound calls made from external units and outbound calls initiated from the call distributor. This significantly reduces the call handling efficiency of the agents. During slow periods of inbound call traffic the agents assigned to service only inbound calls frequently stay idle for extended periods of time. Since certain pools of agents are restricted to handling only inbound calls, telephonic calls outdialed by the call distributor are not connected to designated inbound calling agents. Unfortunately, pools of inbound calling agents must wait for an increase in inbound calls in order to perform their exclusive job duties of servicing only received inbound calls. Accordingly, since pools of agents must wait in an idle state for extended periods of time, agent call servicing resources are poorly utilized in such known systems.

Furthermore, during periods in which a high number of inbound calls are received at the call distributor, agents restricted to handling only outbound or outdialed calls are not able to assist in servicing the high volume of received inbound calls. During peak periods of high inbound calling traffic, customers calling from external telephonic units frequently experience long call holding delays. Since, the number of agent pools capable of servicing inbound calls is limited, an increase in the number of inbound calls results in a higher average delay in queue for an inbound call. Moreover, since pools of outbound agents are often available at the call distributor during high inbound calling periods, but are restricted from receiving inbound calls, the call servicing resources of the automatic call distributor are poorly and inefficiently utilized.

SUMMARY OF THE INVENTION

It is therefore a principal object of the present invention to provide a telecommunication system with an automatic call distributor in which the disadvantages of known telecommunications systems noted above are overcome by providing means and methods for automatically distributing both inbound calls and outdialed calls to an agent at an agent telephonic unit.

This object is achieved by provision of a telecommunication system having an automatic call distributor with a multiport switch controlled by a central control processing unit, said automatic call distributor coupled with an external telephonic network of external telephonic units, comprising means for automatically distributing outdialed calls to an agent telephonic unit coupled with the call distributor, means for automatically distributing inbound calls to the agent telephonic unit and means for coordinating the outdial call distributing means with the inbound call distributing means to reduce average incoming call waiting time due to excessive distribution of outdialed calls to the agent telephonic unit.

Also, the object of the invention is obtained by providing a telecommunication system having an automatic call distributor with a multiport switch controlled by a central control processing unit, said automatic call distributor coupled with an external telephonic network of external telephonic units the improvement being a method of automatically distributing outdialed calls, comprising the steps of (1) automatically distributing outdialed calls to an agent telephonic unit coupled with the call distributor, (2) automatically distributing inbound calls to the agent telephonic unit and (3) coordinating the distribution of outdial calls with the distribution of inbound calls to reduce average incoming call waiting time due to excessive distribution of outdialed calls to the agent telephonic unit.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 1 is a functional block diagram of the preferred embodiment of the telecommunication system of the present invention as interconnected with a known external telephonic network of external telephonic units; and FIG. 2 is a flow chart of the preferred method of predictively outdialing telephonic calls to external telephonic units illustrative of the preferred computer programs stored in the tandem computer of FIG. 1.

DESCRIPTION OF THE PREFERRED EMBODIMENT

Referring to FIG. 1, telecommunication system 10 is shown having automatic call distributor (ACD) 12 with multiport switch 14 controlled by central control processing unit 16 in conjunction with an associated automatic call distributor memory 18. The automatic call distributor 12 selectively connects telephonic calls between a plurality of agent telephonic units 20 and external telephonic units 22 coupled with external telephonic switches 24 of an external telephonic network 26. Each of the agent telephonic units 20 has an associated agent display terminal 30 for display of information received from a host computer 32 coupled with a tandem computer 34. Preferably, the host computer 32 stores customer information regarding customers located at external telephonic units 22 and display of such customer information at the agent display terminals 30.

The automatic call distributor 12 receives inbound telephonic calls initiated by the external telephonic units 22 of the external network 26 and distributes the inbound calls received at the multiport switch 14 to agents stationed at the agent telephonic unit 20 coupled with the automatic call distributor 12. Additionally, the telecommunication system 10 of the present invention performs a campaign of outdial or outbound calls to the external telephonic units 22 which is initiated from the automatic call distributor 12 and appropriately routes the outdial calls answered at the external units to agents at the agent telephonic unit 20 in accordance with a predetermined application associated with the campaign. The agents at the internal telephonic units 20 service the inbound and outdialed calls in accordance with a particular telemarketing scheme such as providing customer service, by the external units or presenting sales information to potential customers at the external units.

The central control processing unit 16 is the primary controller for the automatic call distributor 12. Preferably, the processing power the central control processing unit 16 is provided by a 32 bit Motorola 68030 microprocessor capable of either simplex or duplex operation. Alternatively, the central processing unit 16 is either a DEC PDP 11/34, 11/44, 11/84 or 11/94 manufactured by the Digital Equipment Corporation. The switch has a many as 3,000 I/O ports for connection to the agent telephonic units 20, to one or more voice response units and to supervisory and other units, not shown. Generally, while the telecommunication system of the present invention can be implemented in numerous types and sizes of automatic call distributors, it is preferably employed in a call distributor of the types shown in U.S. Pat. No. 5,268,903 of Jones et al. entitled "Multichannel Telephonic Switching Network With Different Signaling Formats and Connect/PBX Treatment Selectable For Each Channel", issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

The host computer 32 communicates with another computer, preferably a tandem type computer, 34 of via IBM 3270 data communications link. The tandem computer 34 performs data communication with the central processing units 16 of the automatic call distributor 12 via an X.25 data communications link. The host computer 32 provides database access to customer information such as names, addresses, and purchasing order data pertaining to customers at the external telephonic units. Customer information gathered by agents at the internal telephonic units 20 is entered at associated data terminals 30 for storage at the host computer. The host computer 32 is an external remote mainframe computer which selectively is provided by the purchaser or user of the system 10.

The automatic call distributor 12 provides the other computer, or tandem computer, 34 with information regarding the operation at the multiport switch 14 and the tandem computer 34 performs the pacing for the sending of the outdial calls initiated at the automatic call distributor. Based on the information received from the automatic call distributor 12, the tandem computer 34 sends outdial requests to the automatic call distributor. Upon receipt of the outdial call request from the tandem computer 34, the automatic call distributor 12 then initiates the outdialing of calls to external telephonic units. To achieve effective pacing of outdial calls, thereby reducing delays in queue, the automatic call distributor 12 continuously sends information relating to changing call processing conditions at the switch 14 to the tandem computer 34. This information is needed for the tandem computer 34 to effectively predict the optimum outdial calling procedure. The tandem computer preferably used in the telecommunication system of the present invention is a Tandem K112 two processor type mini computer having a thirty-two megabyte memory for storage of the predictive outdialing software code.

The call pacing algorithm is a set of software routines comprising a program executing on the tandem computer 34 which provides instructions to the automatic call distributor 12. The coded computer program stored at the tandem computer 34 performs the pacing of outdial calls to be initiated at the automatic call distributor 12. The objective of the pacing algorithm at the tandem computer 34 is to initiate new outdial calls at a rate which minimizes the average delay in queue while maximizing the utilization of agents stationed at the agent telephonic units. Preferably, the coded predictive outdial calling algorithms stored at the tandem computer are of the type shown in U.S. Pat. No. 4,881,261 of Oliphant et al., issued Nov. 14, 1989 herein incorporated by reference and assigned to the same assignee of the present invention.

The tandem computer 34 has a list of calls (e.g. a campaign) which are paced through the automatic call distributor 12. These outdial calls, are placed in a queue for a gate comprising of a pool of agent telephonic units 20 in response to an answer detected at an external unit 22. The calls are then routed to a particular agent stationed at an agent telephonic unit 20 upon the agent becoming available to receive a call. Preferably, all calls for a particular campaign are routed to the same queue or pool of agent telephonic units 20.

In accordance with the present invention, the call distributor 12, operating under the control of the central processing unit 16, automatically distributes both answered outdialed calls and received inbound calls to the same agent telephonic unit 20 or to the same group of agent units. The number of outdial calls initiated by the call distributor 12 is coordinated with respect to the number of inbound calls received over a preselected time period to reduce the average call waiting time in queue due to excessive distribution of outdialed calls to the agent telephonic units 20. The tandem computer monitors the number of inbound calls received at the switch 14 over a period of time based on information received from the automatic call distributor 12. The automatic call distributor 12 also stores in memory 18 statistical information relating to the number of outdialed calls performed at the switch 14 over a period of time. The information relating to the number of inbound calls received and outbound calls initiated at the ACD 12 is transmitted to the tandem computer 34.

The tandem computer 34 utilizes the inbound and outdial call information to calculate the number and the rate of inbound calls received compared to the rate outbound calls made at the ACD 12. The call pacing algorithm at the tandem computer 34 uses the compared rates of inbound versus outbound calls to automatically control the rate of outdial calls. The tandem computer 34 communicating with the ACD 12 proportionately reduces the number of outdial calls during a preselected time period by the ratio of the outdial calls made to the combined total number of inbound calls and outbound calls placed by the ACD during a prior preselected time period.

The number of outdialed calls is divided by the total number of inbound and outdialed calls for a period of time. This amount is then multiplied by the number of outdial requests made from the outdial call pacing algorithm at the tandem computer 34. Accordingly, the number of outdial requests made is lowered based upon the number of inbound calls previously received. Preferably, the period of time rolls forward in minute intervals. On a selectable basis, the number of minutes used for the rolling average period of time is calculated by using a multiple of the expected call hold time. The number of outbound dial requests is calculated based upon the predictive outbound dialing algorithm running at the tandem computer 34.

The tandem computer 34 of the telecommunication system 10 receives timely and accurate data from the ACD 12 effectively predict the pacing of outdialed calls. The call pacing program operating at the tandem computer 34 uses statistical data for both inbound and outdial calls in a particular gate associated with a pool of agent units 20 to limit the system from requesting too many calls during a high inflow of inbound calls which results in excessive call holding times.

The predictive call pacing is implemented on the telecommunication system 10 having an automatic call distributor which interacts with a database system comprising a tandem computer 34 coupled with an optional host computer 39. The predictive call pacing algorithm process executes on the tandem computer 34 and provides instructions to the ACD 12. The objective of the pacing process is to initiate new outdialed calls at a rate which minimizes the average delay in queue while maximizing the utilization of agent telephonic units 20 coupled with the switch 14. The data that is gathered by-the database system is based upon results returned from the automatic call distributor 12.

The call distribution system 12 has certain functionality, including the capability of interacting with the tandem computer 34 and host computer 32, the ability to route and place outdialed calls, to detect voice answer, and to place the resulting completed calls into a queue for servicing. The interaction of the automatic call distributor 12 with the tandem computer 34 and host computer 32 database system includes the following:

1) The ability to accept outdialing instructions from the tandem computer 34, and to notify the tandem computer of the results of the outdial request, including information regarding the resulting call connection. The dialing instructions include information regarding the desired queue into which the outdial call is placed, as well as an identifying serial number or sequence designation by which the individual dial request is referenced for later communication.

2) The ability to supply the tandem computer 34 with information regarding the connection of inbound and outdialed calls, the call status of individual agent telephonic units 20 or groups of units in the system 10, and the state of the call distributor queues to inform the tandem computer 34 of the constantly changing call switching conditions at the ACD 12.

3) The tandem computer 34 has a list of outdial calls (e.g. a campaign) to be placed through the ACD 12. These calls, when answered at external units 26, are placed in a queue and then routed to a particular agent telephonic unit 20. Multiple campaigns at the call distributor are preferably assigned to different queues with each campaign having an associated call pacer.

4) The outdial call pacing objective is to achieve a zero, or near zero, maximum delay in queue. The combined total number of both inbound an outdial calls concurrently connected to a pool of agent telephonic units 20 is limited to an upper value called the pacer limiter. The pacer limiter works to avoid the adverse distribution of outdialed calls during peak periods by maintaining an upper limit of dial requests per time period based upon the number of pacers actively working on a campaign. The average delay in queue is dependant upon timely and accurate information such as the call setup times and the call hold times of all of the calls offered in the campaign.

The predictive outdial algorithm running at the tandem computer 34 determines the pacing of outdial calls based on call switching and connection statistical information transmitted from the ACD 12. The call connection information includes data relating to the connections of both inbound calls and outdialed calls received at the agent telephonic units 20. In the preferred embodiment, a group or pool of agent telephonic units 20 are associated with a particular gate of the ACD 12. The telephonic calls received at the switch 14 are placed in queue for distribution to a particular corresponding pool of agent telephonic units 20. All the agent telephonic units 20 of the group are enabled to receive both inbound calls and outdialed calls in queue thereby permitting the agents stationed at the agent units to service both types of calls received at the switch 14.

The statistical information which the tandem computer 34 utilizes in order to pace requests for outdialed calls connected at agent units 20 servicing both inbound and outdialed calls includes information relating to: the average delay in queue for both inbound calls and outdialed calls, the average call connection time for both inbound and outdialed calls connected at the agent units 20, and the total number of inbound calls received at the automatic call distributor 12 for a preselected time period. Data concerning the total number of agent telephonic units 20 arranged in a queue which receive both inbound and outdialed calls is also utilized by the tandem computer 34 for determining the pacing of calls for a particular campaign.

Based on the call switching and connection information received from the ACD 12, the tandem computer 34 determines the rate of outdialed calls required to reduce the average waiting time of calls placed in queue. The running tandem computer calculates the number of predictive outdial requests required to reduce the average call waiting time compared to the total number of agent telephonic units 20 required to be available to accept a recent inflow of inbound calls from external units 26 during a preselected time period. The outdial predictive program operating at the tandem computer 34 paces the connection of outdialed calls to an agent telephonic units 20 as soon as the agent units become available to receive the calls. The goals of predictive outdial call pacing are maintained by minimizing the number of abandoned calls and maximizing the combined total number of inbound and outdial call connections per agent telephonic unit while enabling an agent to efficiently receive and service both inbound and outdialed calls.

Agents at agent telephonic units 20 sign into a combined inbound and outbound predictive dialing application or gate to have the ability to receive both inbound and outbound predictive dial connected call. Once an agent completes a call i.e. either outdialed or inbound, the agent unit 20 becomes available to service another calls. If an inbound call is received at the switch 14 prior to the next predictive outdialed call being connected to an agent unit 20, then the agent unit is connected to the received inbound call. The tandem computer 34 distinguishes between received inbound calls and answered outdialed calls on the switch 14 based on tagged information received from the automatic call distributor 12. The automatic call distributor 12 places different information in an inbound message as opposed to an outbound connect message. Each outdialed call initiated by the ACD 12 is labeled or tagged with identification information to identify a call as being an outdialed call. The outdial identification information tag is carried with the outdial call when the answered call returns to the multiport switch 14 indicating receipt of an outdial call. If a call is received at the switch 14 without an outdial identification tag, then the call is a received inbound call initiated from an external telephonic unit 22. An agent telephonic unit 20 is connected to an inbound call if the inbound call is received at the ACD 12 prior to the initiation of a call predictively outdialed by the ACD. If an answered predictive outdial call is received at the switch 14 prior to an inbound call, then the agent telephonic unit 20 is connected to the outdialed call.

While the advantages of the invention are preferably obtained with the telecommunication system 10 described above with reference to FIG. 1, the method of the invention can be practiced in other types of telecommunication systems having an automatic call distributor with a multiport switch controlled by a central processing unit and an associated memory, in which the automatic call distributor distributes calls connected with external telephonic units of an external telephonic network. In any event, the preferred method of practicing the invention of automatically predictively distributing outdialed calls comprises the steps of (1) automatically distributing outdialed calls to an agent telephonic unit coupled with the call distributor, (2) automatically distributing inbound calls to the agent telephonic unit, and (3) coordinating the distribution of outdialed calls with the distribution of inbound calls to reduce the average incoming call waiting time due to excessive distribution of outdialed calls to the agent telephonic unit. The method of automatically distributing outdialed calls further includes the step of monitoring the number of inbound calls and outdialed calls during a particular time period, calculating the rate of inbound calls compared to outdialed calls in response to the monitoring of the number of inbound and outdialed calls and automatically controlling the rate of outdialed calls in response to the calculation of the rate of inbound calls compared to outdialed calls.

Referring now to FIG. 2 the method of automatically predictively outdialing calls to agent telephonic units servicing both inbound and outdialed calls is illustrated in the flow chart of the preferred predictive outdialing computer program. The tandem computer 34 contains the computer program to achieve the various functions of the invention described above. FIG. 2 is a conceptual flow chart of the preferred portion of the computer program stored in the memory of the tandem computer 34 of FIG. 1. The preferred computer program listing utilizes and includes inbound calling data as input to the outdial calling programs shown in U.S. Pat. No. 4,881,261 of Oliphant et al., issued Nov. 14, 1989 incorporated herein by reference and assigned to the same assignee of the present invention.

In FIG. 2, the automatic call distributor 12 receives a call connect message indicating that a call is received at the multiport switch 14 in step 100. In step 102, the automatic call distributor 12 determines if the call received at the multiport switch 14 is an inbound call or a predictively outdialed call. If the call is a predictive outdialed call, then in step 104, statistical information relating to the calling conditions at the switch 14 is transmitted to the routines which determine the input into the predictive outdialing algorithm at the tandem computer 34. The types of statistical information sent includes the average waiting time between calls, the amount of time in queue for calls, the average call set up time, the number of calls dialed before connection to an agent unit, the number of agent units signed into the system, the total number of agents available to receive calls, the average call holding time and the amount of agent servicing time for particular calls. If the call is an inbound call, then in step 106 the percentage of inbound calls versus the total number of calls (i.e. both inbound and outdialed) received at the switch 14 over a preselected previous time period is calculated. In step 108, the predictive outdialing program at the tandem computer 34 determines the number of predictive outdial requests that are needed to consistently connect calls and keep busy a known number of agent telephonic units 20. The number of agent outdial requests determined at the tandem computer 34 and sent to the ACD 12 required to minimize the waiting time for calls in queue is reduced by the percentage of inbound calls received at the switch 14. Accordingly, a certain number of agents stationed at agent units 20 in the pool of agent units are available to service inbound calls as they are received at the switch 14.

While a detailed description of the preferred embodiment of the invention has been given, it should be appreciated that many variations can be made thereto without departing from the scope of the invention as set forth in the appended claims.

We claim:

1. A telecommunication system having an automatic call distributor with a multiport switch controlled by a central control processing unit, said automatic call distributor coupled with an external telephonic network of external telephonic units comprising:

means for designating selected agent telephonic units for combined inbound and outdialed operation;

means for automatically distributing both outdialed calls and inbound calls to each of the agent telephonic units selected for combined inbound and outdialed operation including means for automatically distributing outdialed calls to each of said selected agent telephonic units coupled with the call distributor, and means for automatically distributing inbound calls to each of said selected agent telephonic units; and means for coordinating the outdial call distributing means with the inbound call distributing means to reduce average incoming call waiting time due to excessive distribution of outdialed calls to the selected agent telephonic units including means for monitoring the number of inbound calls received by the call distributor and distributed to the selected agent telephonic units and the number of outdialed calls initiated by the call distributor and distributed to the selected agent telephonic units, means responsive to the monitoring means for calculating the rate of inbound calls of the selected agent telephonic units compared to the rate of outdialed calls of the selected agent telephonic units, and means responsive to the calculating means to automatically control the rate of outdialed calls of the selected agent telephonic units compared to the rate of inbound calls distributed to the selected agent telephonic units.

2. The telecommunication system of claim 1 in which the coordinating means includes means for determining an average delay in queue for both inbound and outdialed calls.

3. The telecommunication system of claim 1 in which the coordinating means includes means for determining the average time per inbound call and per outdialed call connected with the agent telephonic unit.

4. The telecommunication system of claim 1 in which the coordinating means includes means for determining a total number of inbound calls received at the automatic call distributor for a preselected time period, and means for determining a total number of a plurality agent units in a queue receiving both inbound calls and outdial calls.

5. The telecommunication system of claim 1 including another computer coupled with the automatic call distributor for determining the pacing of outdial calls initiated from the automatic call distributor and received at the external telephonic units, and means for transmitting to the other computer call connection information regarding the connection of both inbound calls and outdialed calls received at the agent telephonic unit.

6. The telecommunication system of claim 1 including means for placing in queue a pool of a plurality of agent telephonic units, and means for establishing an upper limit value of a pacer limiter for a combined total number of both inbound calls and outdial calls concurrently connected to the pool of agent telephonic units including maintaining a limit for the number of outdial requests made during a preselected period of time.

7. The telecommunication system of claim 1 including means for placing in queue a pool of a plurality of agent telephonic units, and means for enabling all the plurality of agent telephonic units in the queue to receive both inbound calls and outdialed calls.

8. The telecommunication system of claim 1 including means for proportionately reducing the number of outdialed calls during a preselected time period by the ratio of the outdialed calls to total calls received and placed at the automatic call distributor during a prior preselected time period.

9. The telecommunication system of claim 1 including means for distinguishing the receipt of an inbound call at the automatic call distributor from the initiation of an outdialed call placed from the call distributor, and means for connecting the inbound call to the agent telephonic unit if the inbound call is received at the automatic call distributor prior to the initiation of the outdialed call by the automatic call distributor.

10. The telecommunication system of claim 1 including a pool of a plurality of agent telephonic units, and in which the coordinating means includes means for determining a rate of outdialed calls initiated by the automatic call distributor required to reduce the average call waiting time in queue, and means responsive to the determining means for comparing the rate of outdialed calls required to reduce the average call waiting time with a total number of agent telephonic units in the pool required to be available to accept a plurality of inbound calls received at the call distributor during a preselected period of time.

11. In a telecommunication system having an automatic call distributor with a multiport switch controlled by a central control processing unit, said automatic call distributor coupled with an external telephonic network of external telephonic units, the improvement being a method of automatically distributing outdialed calls comprising the steps of:

designating selected agent telephonic units for combined inbound and outdialed operation;

automatically distributing both outdialed calls and inbound calls to each of the agent telephonic units selected for combined inbound and outdialed operation including automatically distributing outdialed calls to each of said selected agent telephonic units coupled with the call distributor, automatically distributing inbound calls to each of said selected agent telephonic units;

coordinating the distribution of outdialed calls with the distribution of inbound calls to reduce average incoming call waiting time due to excessive distribution of outdialed calls to the selected agent telephonic units;

monitoring the number of inbound calls received by the call distributor and distributed to the selected agent telephonic units and the number of outdialed calls initiated by the call distributor and distributed to the selected agent telephonic units;.

calculating the rate of inbound calls of the selected agent telephonic units compared to the rate of outdialed calls of the selected agent telephonic units in response to the monitoring of the number of inbound calls and outdialed calls; and automatically controlling the rate of outdialed calls compared to the rate of inbound calls distributed to the selected agent telephonic units in response to the calculation of the rate of inbound calls to outdialed calls.

12. The telecommunication system of claim 11 in which the step of coordinating includes the step of determining an average delay in queue for both inbound and outdialed calls.

13. The telecommunication system of claim 11 in which the step of coordinating includes the step of determining the average time per inbound call and per outdialed call connected with the agent telephonic unit.

14. The telecommunication system of claim 11 in which the step of coordinating includes the steps of determining a total number of inbound calls received at the automatic call distributor for a preselected time period, and determining a total number of a plurality agent units in a queue receiving both inbound calls and outdial calls.

15. The telecommunication system of claim 11 including another computer coupled with the automatic call distributor for determining the pacing of outdial calls initiated from the automatic call distributor and received at the external telephonic units, and including the step of transmitting to the other computer call connection information regarding the connection of both inbound calls and outdialed calls received at the agent telephonic unit.

16. The telecommunication system of claim 11 including the steps of placing in queue a pool of a plurality of agent telephonic units, and establishing an upper limit value of a pacer limiter for a combined total number of both inbound calls and outdial calls concurrently connected to the pool of the plurality of agent telephonic units by maintaining a limit for the number of outdial requests made during a preselected period of time.

17. The telecommunication system of claim 11 including the steps of placing in queue a pool of a plurality of agent telephonic units, and enabling all the plurality of agent telephone units in the queue to receive both inbound calls and outdialed calls.

18. The telecommunication system of claim 11 including the step of proportionately reducing the number of outdialed calls during a preselected time period by the ratio of the outdialed calls to total calls received and placed at the automatic call distributor during a prior preselected time period.

19. The telecommunication system of claim 11 including the steps of distinguishing the receipt of an inbound call at the automatic call distributor from the initiation of an outdialed call placed from the call distributor, and connecting the inbound call to the agent telephonic unit if the inbound call is received at the automatic call distributor prior to the initiation of the outdialed call by the automatic call distributor.

20. The telecommunication system of claim 11 including a pool of a plurality of agent telephonic units, and in which the step of coordinating includes the steps of determining a rate of outdialed calls initiated by the automatic call distributor required to reduce the average call waiting time in queue, and comparing the determined rate of outdialed calls required to reduce the average call waiting time in queue with a total number of agent telephonic units in the pool required to be available to accept a plurality of inbound calls received at the call distributor during a preselected period of time.

* * * * *